(12) United States Patent
Oguz

(10) Patent No.: US 8,428,125 B2
(45) Date of Patent: Apr. 23, 2013

(54) TECHNIQUES FOR CONTENT ADAPTIVE VIDEO FRAME SLICING AND NON-UNIFORM ACCESS UNIT CODING

(75) Inventor: Seyfullah Halit Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1161 days.

(21) Appl. No.: 11/961,647

(22) Filed: Dec. 20, 2007

(65) Prior Publication Data
US 2008/0151997 A1 Jun. 26, 2008

Related U.S. Application Data

(60) Provisional application No. 60/876,920, filed on Dec. 22, 2006.

(51) Int. Cl.
*H04N 11/12* (2006.01)
(52) U.S. Cl.
USPC ...................... 375/240.08; 382/173
(58) Field of Classification Search .............. 375/3–16; 725/39–43
See application file for complete search history.

(56) References Cited

U.S. PATENT DOCUMENTS

| | | | | |
|---|---|---|---|---|
| 5,570,126 A | * | 10/1996 | Blahut et al. | 725/93 |
| 2002/0044604 A1 | * | 4/2002 | Nieweglowski et al. | 375/240.03 |
| 2003/0043906 A1 | * | 3/2003 | Bailleul | 375/240.06 |
| 2005/0007459 A1 | * | 1/2005 | Kawai et al. | 348/211.99 |
| 2005/0034155 A1 | * | 2/2005 | Gordon et al. | 725/39 |
| 2007/0153898 A1 | * | 7/2007 | Yim | 375/240.16 |
| 2009/0022219 A1 | * | 1/2009 | Goel | 375/240.08 |

FOREIGN PATENT DOCUMENTS

| | | |
|---|---|---|
| JP | 6311501 A | 11/1994 |
| JP | 2006101527 A | 4/2006 |

OTHER PUBLICATIONS

Puri A. et al.: "Video coding using the H.264/MPEG-4 AVC compression standard" Signal Processing. Image Communication, Elsevier Science Publishers, Amsterdam, NL, vol. 19, No. 9, Oct. 1, 2004, pp. 793-849. XP004607150, ISSN: 0923-5965.
Bjontegaard G. et al.: "Overview of the H.264/AVC video coding standard" IEEE Transactions on Circuits and Systems for Video Technology, IEEE Service Center, Piscataway, NJ, US, vol. 13, No. 7, Jul. 1, 2003, pp. 560-576, XP011099249, ISSN: 1051-8215.
Chong-Wah Ngo et al.: "Video Partitioning by Temporal Slice Coherency" IEEE Transactions on Circuits and Systems for Video Technology, IEEE Service Center, Piscataway, NJ, US, vol. 11, No. 8, Aug. 1, 2001, XP011014230, ISSN: 1051-8215.
Banerji et al.: "Stitching of H.264 video streams for continuous presence multipoint videoconferencing" Journal of Visual Communication and Image Representation, Academic Press, Inc, US, vol. 17, No. 2, Apr. 1, 2006, pp. 490-508, XP005312635, ISSN: 1047-3203.
International Search Report—PCT/US07/088738, International Search Authority—European Patent Office—Jun. 19, 2008.

(Continued)

*Primary Examiner* — Jianye Wu
*Assistant Examiner* — Wanda Z Russell
(74) *Attorney, Agent, or Firm* — Elaine H. Lo

(57) ABSTRACT

Techniques for content adaptive video frame slicing and non-uniform access unit coding for improved coding efficiency are provided. An encoder and decoder are disclosed to process (encode or decode) a single non-uniform video access unit (VAU) employing flexible macroblock ordering (FMO) in conjunction with different slice coding types in response to global motion detection of a camera pan or a scroll within the single VAU.

39 Claims, 14 Drawing Sheets

OTHER PUBLICATIONS

Written Opinion—PCT/US07/088738, International Search Authority—European Patent Office—Jun. 19, 2008.
Dhondt Yves, "Flexible Macroblock Ordering an error resilience tool in H.264/AVC," Fifth FTW Phd Symposium, Faculty of Engineering, Ghent University, Dec. 1, 2004, Paper Nr. 106.
H.264/AVC Video Coding Standard Overview.
Wiegand, Thomas, "Overview of the H.264/AVC Video Coding Standard," IEEE Transactions on Circuits and Systems for Video Technology, pp. 1-19, Jul. 2003.
Taiwan Search Report—TW096149639—TIPO—Sep. 8, 2011.

* cited by examiner

| R1 | A |
| R2 | B |
| R3 | C | D |
| R4 | E | F | G |
| R5 | H |
| R6 | I |
| R7 | J |
| R8 | K | L |
| R9 | M |
| R10 | N |
| R11 | O | P |
| R12 | Q |

New scene detail compared to the referenced I type VAU, due to camera pan to the left.

Slice 1 belongs to Slice Group # 0
Slices 2, 3, 4, 5, 6 and 7 belongs to Slice Group # 1

Slices 1, 2, 3, 4, 5, 6 and 7 belongs to Slice Group # 0
Slice 8 belongs to Slice Group # 1 ated on Dec. 22, 2006, the entire
TECHNIQUES FOR CONTENT ADAPTIVE VIDEO FRAME SLICING AND NON-UNIFORM ACCESS UNIT CODING This application claims the benefit of U.S. Provisional Application No. 60/876,920, filed on Dec. 22, 2006, the entire content of which is incorporated herein by reference.

BACKGROUND

1. Field

The present disclosure relates generally to video encoding and, more specifically, to techniques for content adaptive video frame slicing and non-uniform access unit coding for improved coding efficiency.

2. Background

In all of the current video compression standards, coded representations of video frames or the so called video access units, VAUs, comprise slices as the next lower layer in coding hierarchy. Slice layer allows a functional grouping of (the data of) an integer number of macroblocks in the video frame, fundamentally serving as a resynchronization unit within the coded representation of the frame. In order to serve as proper resynchronization points, all predictive coding schemes/dependencies such as intra-prediction (based on neighboring pixels) and motion vector prediction, are disabled across all slice boundaries.

Until H.264 (and excluding the optional 'Annex K: Slice Structured Mode' Rectangular Slices Submode of H.263+), prior video compression standards such as H.261, MPEG-1, MPEG-2/H.262, H.263, and MPEG-4, supported a slice structure essentially consisting of an integer number of consecutive (in raster scan order) macroblocks, with minor differences in how slice sizes were constrained.

The H.264 standard introduced the concept of 'slice groups' which enables the partitioning of the macroblocks of a frame into slice groups and into slices within slice groups, in a totally arbitrary manner and, therefore not constrained by having to be consecutive in raster scan order. This arbitrary decomposition is described through the so called 'slice group maps' which get transmitted to the decoder in addition to the compressed data of the frame. This provision is known as Flexible Macroblock Ordering (FMO).

There is therefore a need for techniques for content adaptive video frame slicing and non-uniform access unit coding for improved coding efficiency.

SUMMARY

Techniques for content adaptive video frame slicing and non-uniform access unit coding for improved coding efficiency are provided. A device comprising a processor operative to perform content adaptive frame partitioning into slice groups and slices and perform non-uniform video access unit (VAU) coding in a single VAU using one or more slice coding types is provided. In embodiments, a memory is coupled to the processor.

In one aspect, an encoding apparatus comprising an encoding engine operable to employ flexible macroblock ordering (FMO) in conjunction with different slice coding types within a single video access unit (VAU), in response to global motion detection of a camera pan or a scroll is provided.

In another aspect, an encoding apparatus comprising an encoding engine operable to employ flexible macroblock ordering (FMO) in conjunction with different slice coding types within a single video access unit (VAU), in response to one or more changes in a composite scene where the one or more changes affect one or more portions of the video frame rather than the entire video frame. The one or more changes may include cut scene changes, cross-fades, fade-in or fade-outs, zoom-in or zoom-outs, and global motion varieties such as pan or scroll.

In another aspect, a decoding apparatus comprising a decoding engine is provided. The decoding engine is operable to decode a single non-uniformly coded video access unit (VAU) employing flexible macroblock ordering (FMO) in conjunction with different slice coding types within the single VAU.

In another configuration, a computer program product that includes a computer readable medium comprising instructions for processing multimedia data is provided. The instructions, cause a computer to perform content adaptive frame partitioning of a frame into slice groups and slices using flexible macroblock ordering (FMO). The instructions also cause the computer to perform non-uniform VAU coding on the partitioned frame using one or more slice coding types.

In a still further configuration, a computer program product that includes a computer readable medium comprising instructions for processing multimedia data is provided. The instructions, cause a computer to decode a single non-uniformly coded video access unit (VAU) employing flexible macroblock ordering (FMO) in conjunction with different slice coding types within the single VAU.

The techniques described herein provide a way to video access unit coding using multiple slice types for enhanced coding efficiency.

Additional aspects will become more readily apparent from the detailed description, particularly when taken together with the appended drawings.

BRIEF DESCRIPTION OF THE DRAWINGS

Aspects and configurations of the disclosure will become more apparent from the detailed description set forth below when taken in conjunction with the drawings in which like reference characters identify corresponding elements throughout.

Figure 1:
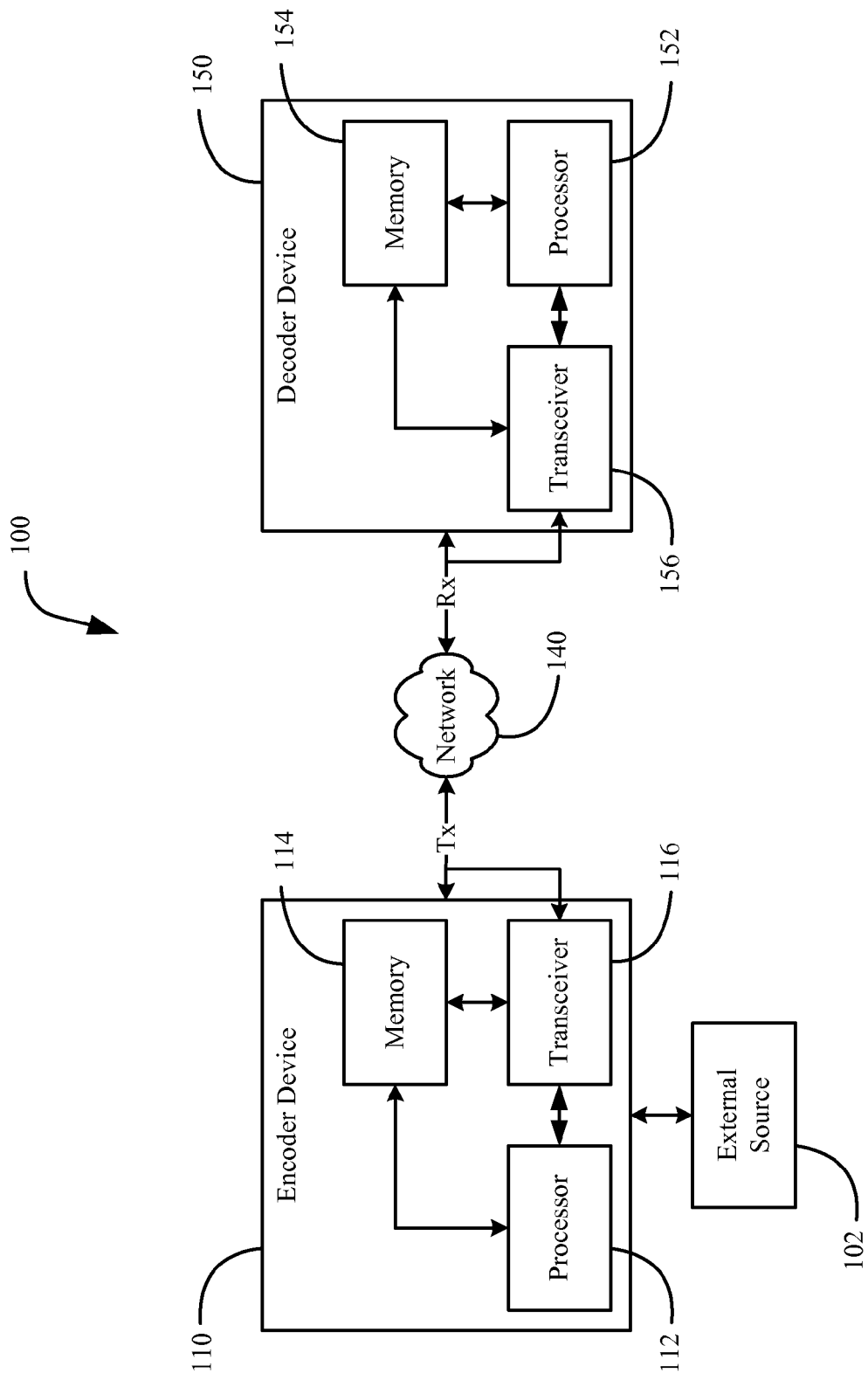
FIG. 1 illustrates a block diagram of an exemplary multimedia communications system according to certain configurations.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

The following detailed description is directed to certain sample configurations. However, the disclosure can be embodied in a multitude of different ways as defined and covered by the claims. In this description, reference is made to the drawings wherein like parts are designated with like numerals throughout.

Video signals may be characterized in terms of a series of pictures, frames, and/or fields, any of which may further include one or more slices. As used herein, the term "frame" is a broad term that may encompass one or more of frames, fields, pictures and/or slices.

Configurations include systems and methods that facilitate channel switching in a multimedia transmission system. Multimedia data may include one or more of motion video, audio, still images, text or any other suitable type of audio-visual data.

Multimedia processing systems, such as video encoders, may encode multimedia data using encoding methods based on international standards such as Moving Picture Experts Group (MPEG)-1, -2 and -4 standards, the International Telecommunication Union (ITU)-T H.263 standard, and the ITU-T H.264 standard and its counterpart, ISO/IEC MPEG-4, Part 10, i.e., Advanced Video Coding (AVC), each of which is fully incorporated herein by reference for all purposes. Such encoding, and by extension, decoding, methods generally are directed to compressing the multimedia data for transmission and/or storage. Compression can be broadly thought of as the process of removing redundancy from the multimedia data.

A video signal may be described in terms of a sequence of pictures, which include frames (an entire picture), or fields (e.g., an interlaced video stream comprises fields of alternating odd or even lines of a picture). Further, each frame or field may further include one or more slices, or sub-portions of the frame or field. As used herein, either alone or in combination with other words, the term "frame" may refer to a picture, a frame, a field or a slice thereof. Video encoding methods compress video signals by using lossless or lossy compression algorithms to compress each frame. Intra-frame coding (also referred to herein as intra-coding) refers to encoding a frame using only that frame. Inter-frame coding (also referred to herein as inter-coding) refers to encoding a frame based on other, "reference," frames. For example, video signals often exhibit temporal redundancy in which frames near each other in the temporal sequence of frames have at least portions that exactly match or at least partially match each other.

Multimedia processors, such as video encoders, may encode a frame by partitioning it into subsets of pixels. These subsets of pixels may be referred to as blocks or macroblocks (MB) and may include, for example, 16×16 pixels. The encoder may further partition each 16×16 macroblock into subblocks. Each subblock may further comprise additional subblocks. For example, subblocks of a 16×16 macroblock may include 16×8 and 8×16 subblocks. Each of the 16×8 and 8×16 subblocks may include, for example, 8×8 subblocks, which themselves may include, for example, 4×4, 4×8 and 8×4 subblocks, and so forth. As used herein, the term "block" may refer to either a macroblock or any size of subblock.

Encoders take advantage of temporal redundancy between sequential frames using inter-coding motion compensation based algorithms. Motion compensation algorithms identify portions of one or more reference frames that at least partially match a block. The block may be shifted in the frame relative to the matching portion of the reference frame(s). This shift is characterized by one or more motion vector(s). Any differences between the block and partially matching portion of the reference frame(s) may be characterized in terms of one or more residual(s). The encoder may encode a frame as data that comprises one or more of the motion vectors and residuals for a particular partitioning of the frame. A particular partition of blocks for encoding a frame may be selected by approximately minimizing a cost function that, for example, balances encoding size with distortion, or perceived distortion, to the content of the frame resulting from an encoding.

Inter-coding enables more compression efficiency than intra-coding. However, inter-coding can create problems when reference data (e.g., reference frames or reference fields) are lost due to channel errors, and the like. In addition to loss of reference data due to errors, reference data may also be unavailable due to initial acquisition or reacquisition of the video signal at an inter-coded frame. In these cases, decoding of inter-coded data may not be possible or may result in undesired artifacts and errors which may propagate. These scenarios can result in unpleasant user experience for an extended period of time.

An independently decodable intra-coded frame is the most common form of frame that enables re/synchronization of the video signal. The MPEG-x and H.26x standards use what is known as a group of pictures (GOP) which comprises an intra-coded frame (also called an I-frame) and temporally predicted P-frames or bi-directionally predicted B frames that reference the I-frame and/or other P and/or B frames within the GOP. Longer GOPs are desirable for the increased compression rates, but shorter GOPs allow for quicker acquisition and re/synchronization. Increasing the number of I-frames will permit quicker acquisition and re/synchronization, but at the expense of lower compression.

FIG. 1 illustrates a block diagram of an exemplary multimedia communications system 100 according to certain configurations. The system 100 includes an encoder device 110 in communication with a decoder device 150 via a network 140. In one example, the encoder device 110 receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140. In this example, the decoder device 150 comprises a processor 152 coupled to a memory 154 and a transceiver 156. The processor 152 may include one or more of a general purpose processor and/or a digital signal processor. The memory 154 may include one or more of solid state or disk based storage. The transceiver 156 is configured to receive multimedia data over the network 140 and provide it to the processor 152 for decoding. In one example, the transceiver 156 includes a wireless transceiver. The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM/GPRS (General packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, a DVB-H system, and the like.

Figure 2A:
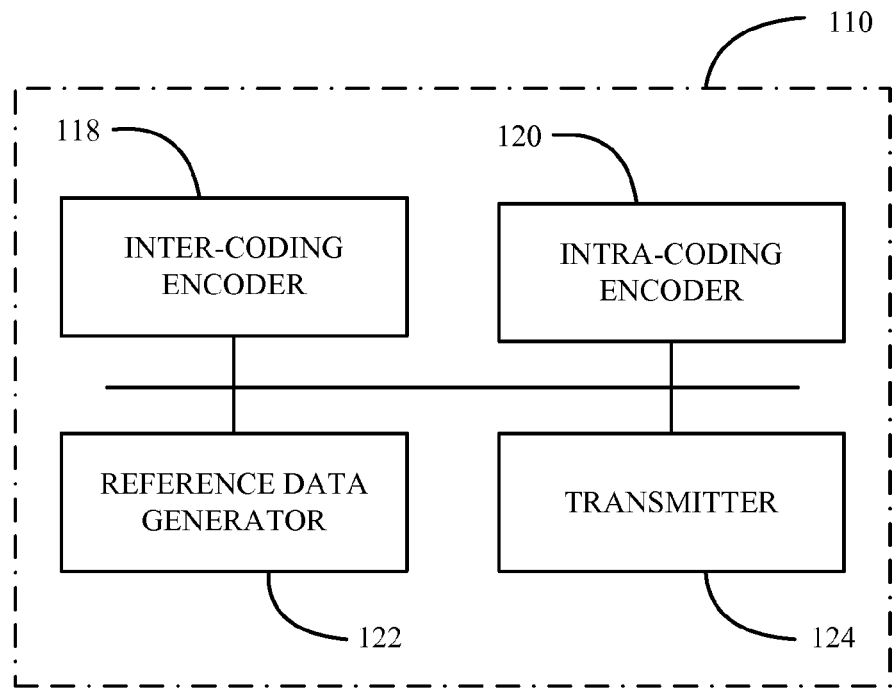
FIG. 2A illustrates a block diagram of an exemplary encoder device that may be used in the system of FIG. 1.

FIG. 2A illustrates a block diagram of an exemplary encoder device 110 that may be used in system 100 of FIG. 1 according to certain configurations. In this configuration, the encoder 110 comprises an inter-coding encoder element 118, an intra-coding encoder element 120, a reference data generator element 122 and a transmitter element 124. The inter-coding encoder 118 encodes inter-coded portions of video that are predicted temporally (e.g., using motion compensated prediction) in reference to other portions of video data located in other temporal frames. The intra-coding encoder 120 encodes intra-coded portions of video that can be decoded independently without reference to other temporally located video data. In some configurations, the intra-coding encoder 120 may use spatial prediction to take advantage of redundancy in the other video data located in the same temporal frame.

The reference data generator 122, in one aspect, generates data that indicates where the intra-coded and inter-coded video data generated by the encoders 120 and 118 respectively are located. For example, the reference data may include identifiers of subblocks and/or macroblocks that are used by a decoder to locate a position within a frame. The reference data may also include a frame sequence number used to locate a frame within a video frame sequence.

The transmitter 124 transmits the inter-coded data, the intra-coded data, and, in some configurations, the reference data, over a network such as the network 140 of FIG. 1. The data may be transmitted over one or more communication links. The terms communication links are used in a general sense and can include any channels of communication including, but not limited to, wired or wireless networks, virtual channels, optical links, and the like. In some configurations the intra-coded data is transmitted on a base layer communication link and the inter-coded data is transmitted over an enhancement layer communication link. In some configurations, the intra-coded data and the inter-coded data are transmitted over the same communication link. In some configurations, one or more of the inter-coded data, the intra-coded data and the reference data may be transmitted over a sideband communication link. For example, a sideband communication link such as the Supplemental Enhancement Information (SEI) messages of H.264 or user_data messages of MPEG-2 may be used. In some configurations, one or more of the intra-coded data, the inter-coded data and the reference data are transmitted over a virtual channel. A virtual channel may comprise data packets containing an identifiable packet header that identifies the data packet as belonging to the virtual channel. Other forms of identifying a virtual channel are known in the art such as frequency division, time division, code spreading, etc.

Figure 2B:
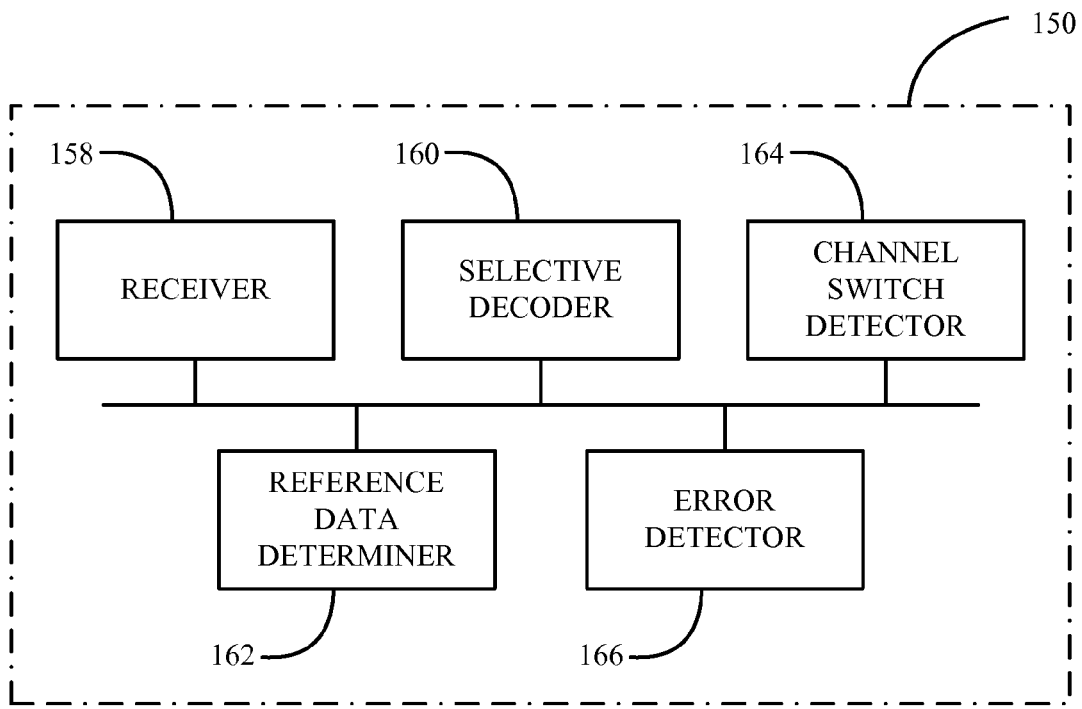
FIG. 2B illustrates a block diagram of an exemplary decoder device that may be used in the system of FIG. 1.

FIG. 2B illustrates a block diagram of an exemplary decoder device 150 that may be used in system 100 of FIG. 1 according to certain configurations. In this configuration, the decoder 150 comprises a receiver element 158, a selective decoder element 160, a reference data determiner element 162, and one or more reference data availability detectors such as a channel switch detector element 164 and an error detector element 166.

The receiver 158 receives encoded video data (e.g., data encoded by the encoder 110 of FIGS. 1 and 2A). The receiver 158 may receive the encoded data over a wired or wireless network such as the network 140 of FIG. 1. The data may be received over one or more communication links. In some configurations, the intra-coded data is received on a base layer communication link and the inter-coded data is received over an enhancement layer communication link. In some configurations, the intra-coded data and the inter-coded data are received over the same communication link. In some configurations, one or more of the inter-coded data, the intra-coded data and the reference data may be received over a sideband communication link. For example, a sideband communication link such as the Supplemental Enhancement Information (SEI) messages of H.264 or user_data messages of MPEG-2 may be used. In some configurations, one or more of the intra-coded data, the inter-coded data and the reference data are received over a virtual channel. A virtual channel may comprise data packets containing an identifiable packet header that identifies the data packet as belonging to the virtual channel. Other forms of identifying a virtual channel are known in the art.

The selective decoder 160 decodes the received inter-coded and intra-coded video data. In some configurations, the received data comprises an inter-coded version of a portion of video data and an intra-coded version of the portion of video data. Inter-coded data can be decoded after the reference data upon which it was predicted is decoded. For example, data encoded using motion compensated prediction comprises a motion vector and a frame identifier identifying the location of the reference data. If the portion of the frame identified by the motion vector and the frame identifier of the inter-coded version is available (e.g., already decoded), then the selective decoder 160 can decode the inter-coded version. If however, the reference data is not available, then the selective decoder 160 can decode the intra-coded version.

The reference data determiner 162, in one aspect, identifies received reference data that indicates where the intra-coded and inter-coded video data in the received encoded video data are located. For example, the reference data may include identifiers of subblocks and/or macroblocks that are used by the selective decoder 160 to locate a position within a frame. The reference data may also include a frame sequence number used to locate a frame within a video frame sequence. Using this received reference data enables a decoder to determine if the reference data upon which inter-coded data depends is available.

Reference data availability can be affected by a user switching a channel of a multi-channel communication system. For example, multiple video broadcasts may be available to the receiver 158, using one or more communication links. If a user commands the receiver 158 to change to a different broadcast channel, then reference data for the inter-coded data on the new channel may not be immediately available. The channel switch detector 164 detects that a channel switch command has been issued and signals the selective decoder 160. Selective decoder 160 can then use information obtained from the reference data determiner to identify if reference data of the inter-coded version is unavailable, and then identify the location of the nearest intra-coded version and selectively decode the identified intra-coded version.

Reference data availability can also be affected by errors in the received video data. The error detector 166 can utilize error detection techniques (e.g., forward error correction) to identify uncorrectable errors in the bitstream. If there are uncorrectable errors in the reference data upon which the inter-coded version depends, then the error detector 166 can signal the selective decoder 160 identifying which video data are affected by the errors. The selective decoder 160 can then determine whether to decode the inter-coded version (e.g., if the reference data is available) or to decode the intra-coded version (e.g., if the reference data is not available).

In certain configurations, one or more of the elements of the encoder 110 of FIG. 2A may be rearranged and/or combined. The elements of the encoder 110 may be implemented by hardware, software, firmware, middleware, microcode or any combination thereof. In certain configurations, one or more of the elements of the decoder 150 of FIG. 2B may be rearranged and/or combined. The elements of the decoder 150 may be implemented by hardware, software, firmware, middleware, microcode or any combination thereof.

Certain configurations of this disclosure can be implemented, for example, using MediaFLO™ video coding for delivering realtime video services in TM3 systems using the FLO Air Interface Specification, "Forward Link Only [FLO] Air Interface Specification for Terrestrial Mobile Multimedia Multicast", published as Technical Standard TIA-1099, August 2006, which is fully incorporated herein by reference for all purposes.

Raster scan ordering inevitably imposes a horizontal nature to the slice partitions. Two slice partitioning samples, respectively for MPEG-1 and MPEG-2, are illustrated in FIGS. 3A and 3B.

Figures 3A, 3B:
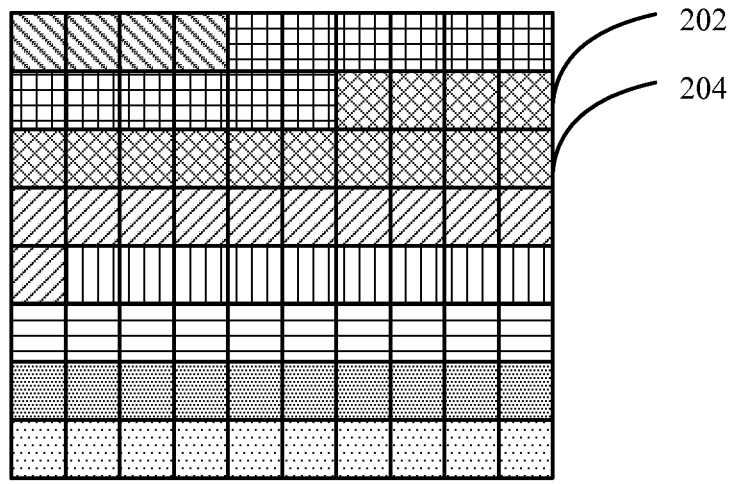
FIG. 3A illustrates a first exemplary frame having a sample slice partitioning according to certain configurations using a slice structure in accordance with the MPEG-1 standard.
FIG. 3B illustrates a second exemplary frame having a sample slice partitioning according to certain configurations using a slice structure in accordance with the MPEG-2 standard.

FIG. 3A illustrates a first exemplary sample slice partitioning of a frame 200 according to certain configurations using a slice structure in accordance with the MPEG-1 standard. The different slice partitions are denoted by different cross hatching. In this example, some of the macroblocks of the slices occupy two horizontal rows that are adjacent. In this frame 200, a slice structure includes macroblocks 202 on a first horizontal row and macroblocks 204 on a second horizontal row. In these structures not all of the macroblocks in a slice group needs to be immediately adjacent.

FIG. 3B illustrates a second exemplary sample slice partitioning of a frame 210 according to certain configurations using a slice structure in accordance with the MPEG-2 standard. In FIG. 3B, the slice structures are individually denoted by A-Q. These slice structures are horizontally arranged from row to row without order. For example, the slice structure A extends the entire first horizontal row R1. Likewise, the slice structure B extends the entire second horizontal row R2. However, in this example, in the third horizontal row R3, the row R3 is shared by the slice structures C and D. The arrangement of slice structure on the horizontal rows R1, R2, R3, R4, R5, R6, R7, R8, R9, R10, R11, and R12 are intended to be exemplary. Nonetheless, each slice can occupy at most one horizontal row only and the right boundary of the frame always marks the end of a slice.

Figure 4A:
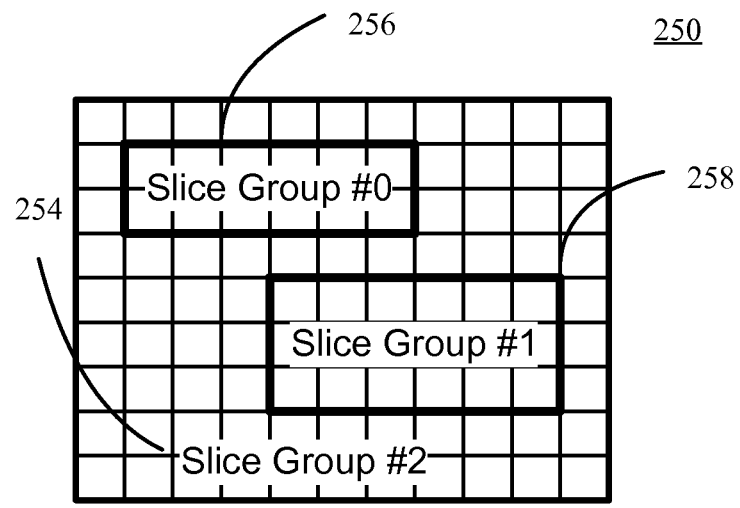
FIG. 4A illustrates a sample frame with Type 2 Flexible Macroblock Ordering (FMO) based partitioning according to the H.264/AVC standard.

FIG. 4A illustrates a sample frame 250 with Type 2 Flexible Macroblock Ordering (FMO) based partitioning according to the H.264/AVC standard. In FIG. 4A, the frame 250 includes one background 254 denoted by slice group #2 and two (2) foreground partitions 256 and 258 for region of interest (ROI) coding denoted by slice groups #0 and #1, respectively. As can be seen, the foreground partition 256 has a region of interest in the frame as a box shaped structure including macroblocks that are neighboring for a subset of rows and a subset of the columns. However, the macroblocks in the partition 256 are neighboring. Thus, the foreground partition 258 also includes macroblocks which are arranged to include a subset of vertically and horizontally neighboring macroblocks. The partition 256 and partition 258 are marked as rectangular areas to denote the ROI for that specific partition. Hence, the top left and bottom right coordinates of these rectangles are necessary and are communicated from the encoder device 110 to the decoder device 150.

Figure 4B:
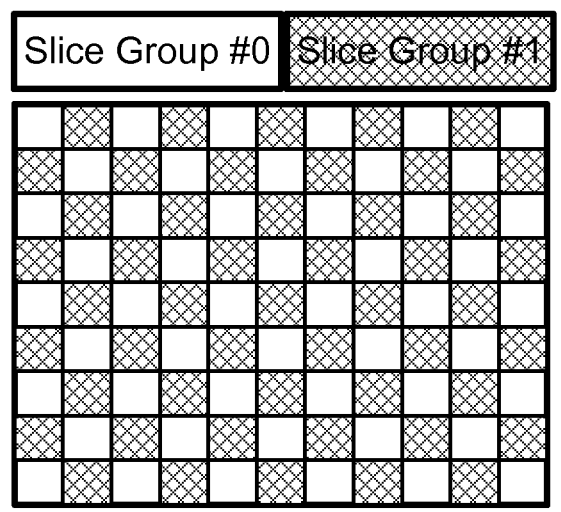
FIG. 4B illustrates a sample frame with Type 1 FMO based partitioning according to the H.264/AVC standard.

FIG. 4B illustrates a sample frame 300 with Type 1 FMO based on partitioning according to the H.264/AVC standard. In FIG. 4B, the frame 300 includes a checker-board pattern for improved error resilience and concealment. For illustrative purposes, those macroblocks that are depicted as white are associated with slice group #0. Those macroblocks that are depicted as black are for slice group #1. Thus, there is an alternating pattern which can be affected through the use of FMO. This is permitted because the FMO no longer requires the slices to consist of neighboring macroblocks. Thus, the checker-board pattern essentially provides scattered slices.

The FMO of the H.264/AVC standard comprises seven different types, labeled Type 0-Type 6. However, for illustrative purposes only Types 1 and 2 are described here to provide examples of the slice structure. The FMO for the purposes of error resiliency allows macroblocks to be ordered in a manner that no macroblock is surrounded by any other macroblock from the same slice group. Hence, in the event an error occurs (e.g. a slice gets lost during transmission), reconstruction of the missing blocks can rely on the information of the available surrounding macroblocks. Type 6 FMO is the most random type. Type 6 FMO allows full flexibility to the user. The other FMO types such as Type 0-Type 5 are restricting in that a certain pattern must be followed.

Although the FMO assignment supports different uses, so far it has been primarily considered and promoted as an error resilience tool.

In pre-H.264 video compression standards, each VAU's coding type had to be uniform across the entire extent of the video frame. This necessitated that slices composing the frame had to be coded using the same coding type, I (intra), P (predicted), or B (bi-predicted or bi-directionally predicted). This constraint was removed with the introduction of the H.264 standard. H.264 standard allows the use of different coding types within a VAU. Hence the slices of a VAU may in general have different (coding) types, leading to non-uniformly coded VAUs. Furthermore, H.264 also enables a VAU to be generated by using a uniform coding type for an entire video frame, such as an I type VAU, a P type VAU or a B type VAU.

The current configuration provides an encoding engine 500 (FIG. 7) to utilize the FMO provision of H.264 in conjunction with the possibility of using different slice (coding) types within a VAU, to achieve improved coding efficiency in the (common and therefore important) global motion cases of camera pan or scroll as well as instances where the scene is composed of semantically different segments.

Figure 10:
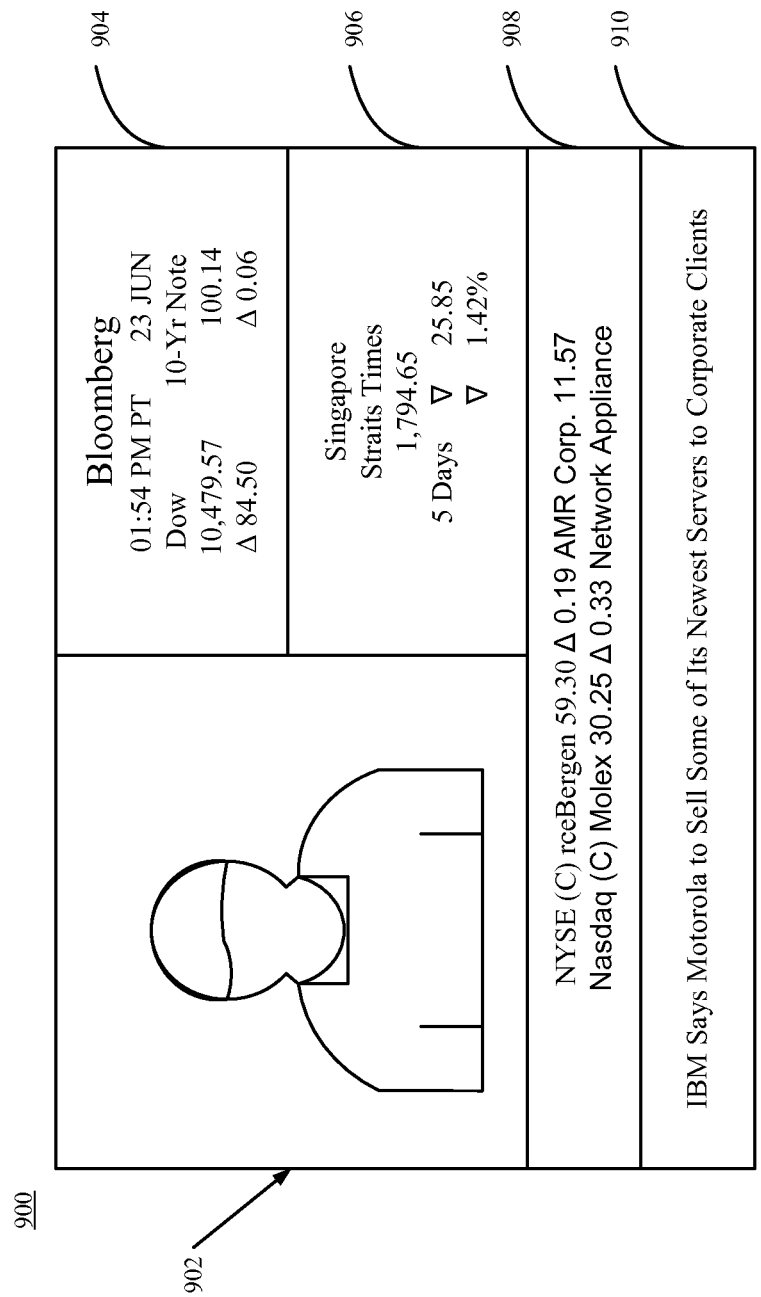
FIG. 10 illustrates a multi-region composite scene VAU with semantically different segments.

FIG. 10 illustrates a composite i.e. multi-region, scene VAU 900 with semantically different segments 902, 904, 906, 908 and 910 such as business news. In the upper left of the scene denoted by segment numeral 902 there is live video (news or advertisement clips). In the upper right there are financial indices denoted by the segment numerals 904 and 906 rendered as large font size text and graphics. At the bottom of the multi-region scene VAU 900 there are ticker symbols & quotes denoted by segment numeral 908 rendered with small font size text and graphics flowing from right to left as well as news flashes rendered as text denoted by segment numeral 910. Within such multi-region scene compositions, different segments of the scene due to their semantic and content differences, will experience asynchronous changes such as 'cut' scene changes, cross-fades, fade-in and fade-outs, zoom-in and zoom-outs. For example if the contents of segment 902 suddenly changes due to a 'cut' scene change, then it is most efficient to encode the macroblocks only within the segment 902 as intra-coded macroblocks, but encode the remaining macroblocks as inter-coded macroblocks to utilize the continuing temporal correlation in segments 904, 906, 908 and 910, the contents of which did not change in this instant. Thus, the content adaptive frame partitioning unit 510 is operative to detect one or more of cut scene changes, cross-fades, fade-in or fade-outs, zoom-in or zoom-outs, and global motion varieties.

Figure 5A:
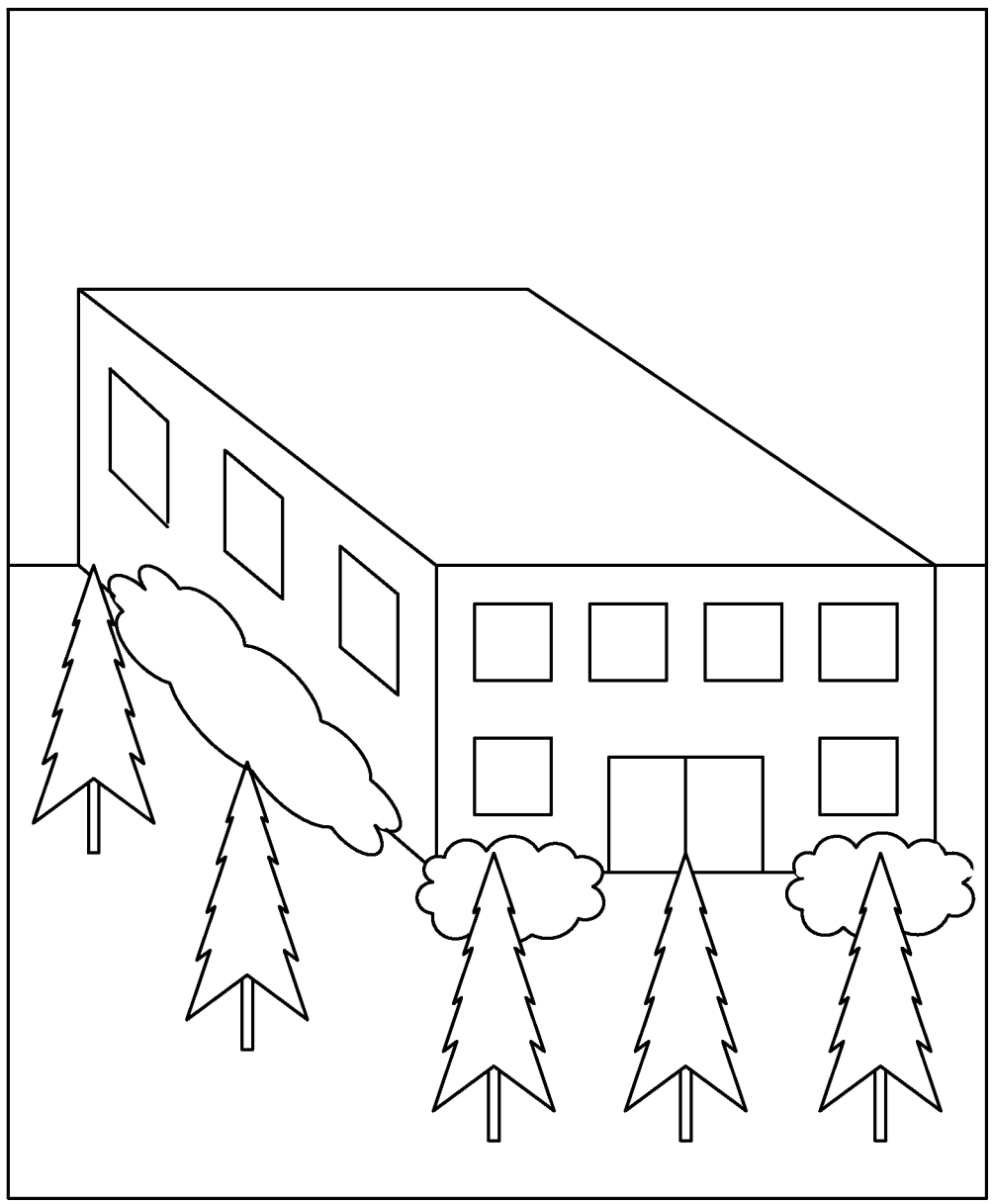
FIG. 5A illustrates an I type coded VAU (Frame #0).
Figure 5B:
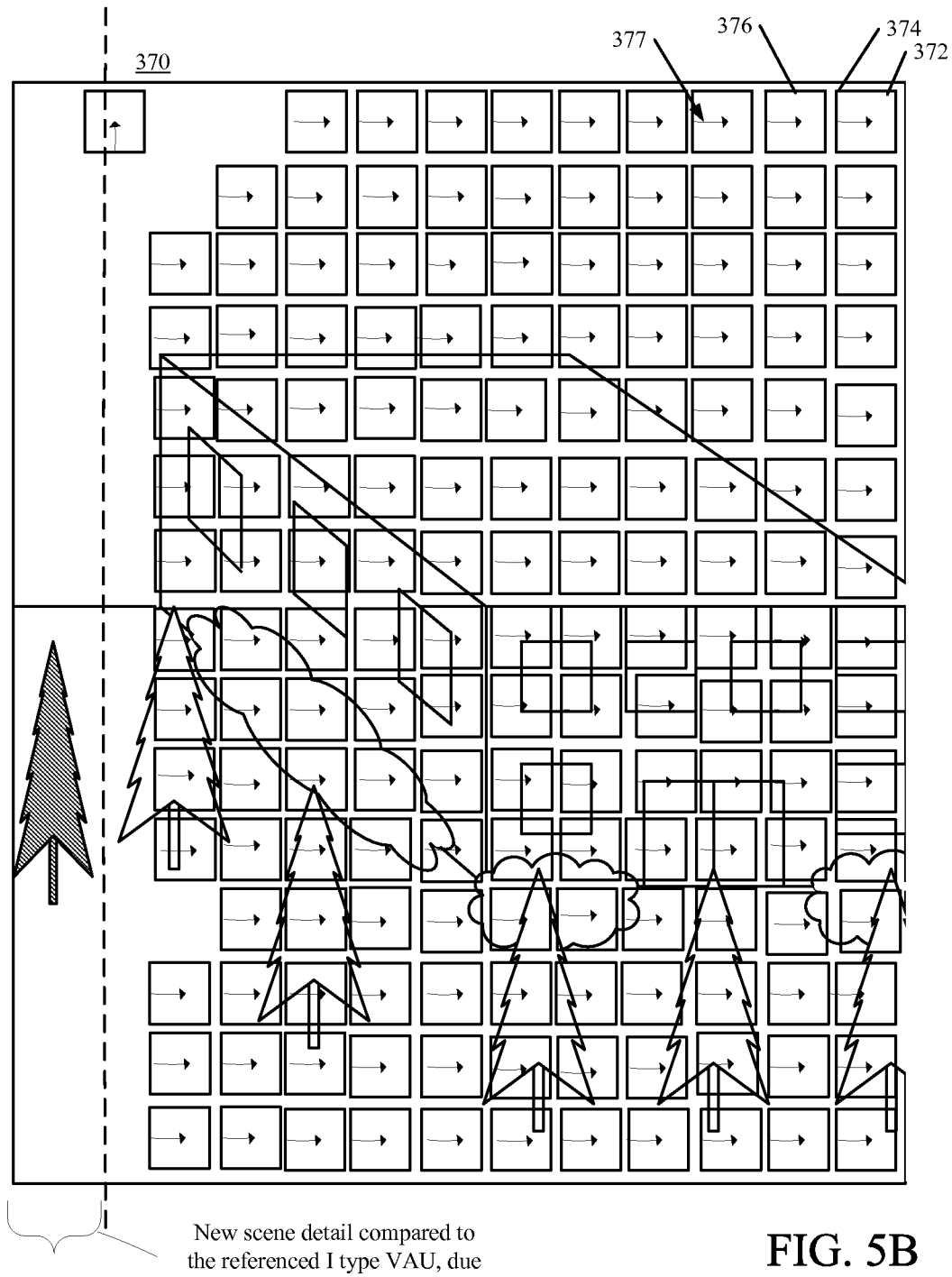
FIG. 5B illustrates a P type coded VAU (Frame #3) with B type VAUs in between Frame #0 and Frame #3 while camera is panning to the left.

FIG. 5A illustrates an I type coded VAU (Frame #0) 350. FIG. 5B illustrates a P type coded VAU (Frame #3) 370 with two B type VAUs (Frames #1 and #2, not illustrated) in between the I and P type VAUs, and with camera panning to the left as it acquires the video signal starting with Frame #0. The content of FIGS. 5A and 5B of the depicted video frames is essentially the same except in FIG. 5B, the scene is being panned to the left as denoted by the dashed vertical line on the left of the VAU 370 which marks the boundary between the new scene detail not visible in Frame #0 and an old scene detail visible and, therefore, available for prediction in Frame #0. For the purposes of this sample illustration, it may be assumed that a camera pointed towards a particular scene with some considerable detail is undergoing an almost pure pan towards left.

Returning again to FIG. 5A, FIG. 5A illustrates the initial I-frame VAU 350 and the subsequent P-frame VAU 370 (FIG. 5B), respectively frames 0 and 3, from a GOP with structure IBBPBBP . . . captured under these circumstances. In the P-frame, the inter-coded i.e., temporally predicted, macroblocks 372 (squares with identified borders 374) and their corresponding motion vectors (tiny arrows 377 in the identified square regions) are shown. The macroblock 376 denotes an immediately adjacent macroblock in a horizontal plane to the macroblock 372. The boundary between the horizontally adjacent macroblocks 372 and 376 is marked-up by borders 374. The remaining macroblocks of the P frame (the borders of which are unidentified and) most of which are along the left border of the frame where due to the nature of the motion new detail are entering the scene, are intra-coded. This macroblock type distribution and the motion vector field structure is very typical for a camera pan (to the left) case. Depending on the camera pan speed and the temporal distance between the P type VAU 370 and its reference frame, the vertical strip of intra-coded macroblocks predominantly existing along the left border of the frame can span one or more macroblock columns. For illustrative purposes, the area along the left border with no boxes or blocks represent the intra-coded macroblocks in FIG. 5B.

The above observation can be generalized to the other cases of camera pan and scroll or more complicated cases of global translational motion within a scene, in a straightforward manner.

TABLE 1

The coded representation of mb_type for an Intra_4 × 4 coded MB in different slice types.

| slice_type | mb_type value for an Intra_4 × 4 macroblock | Coded representation i.e. ue(v) codeword, for the mb_type value | Length of the codeword |
|---|---|---|---|
| 2 or 7, (I) | 0 | 1 | 1 |
| 0 or 5, (P) | 5 | 00110 | 5 |
| 1 or 6, (B) | 23 | 000011000 | 9 |

In all video compression standards, the encoding type (mode) of each MB (except for skipped MBs) is signaled upfront in the bitstream so that the decoder's parsing and entropy decoding process can anticipate the correct syntax for each MB's data and accurately interpret the bitstream. In P type coded slices/VAUs, inter-coded i.e., temporally predicted, MBs define the preferred compression mode and their frequency of occurrence is considerably greater than that of intra-coded MBs in P type coded slices/VAUs. This leads to the following observation. Assuming that Context Adaptive Variable Length Coding (CAVLC) mode of H.264 is used to represent the MB type syntax element 'mb_type', the binary representation of the type of an Intra_4×4 coded MB in different slice types can be summarized as in Table 1.

As can be seen, the use and signaling of unexpected Intra_4×4 coded MBs in P and B slices incur an additional overhead of 4 and 8 bits, respectively. The situation is similar for Intra_16×16 coded MB varieties, although the relevant details will not be provided here. Hence, rest being equal, it is most efficient to instantiate intra-coded MBs in I-slices.

Temporally predicted frames i.e., both P and B type coded VAUs, serve to provide the most significant contribution to the coding efficiency and their sizes should desirably be small. Since intra-coding is the least efficient coding type among the three, the presence of an increased number of intra-coded MBs in a P or B type VAU is an undesirable situation. Nevertheless, when this actually happens, for example, due to complex motion-deformation dynamics in P or B type VAUs, or new objects entering the scene in P type VAUs, the encoder's task is to execute the encoding of these intra MBs in the most efficient way possible.

Figures 6A, 6B:
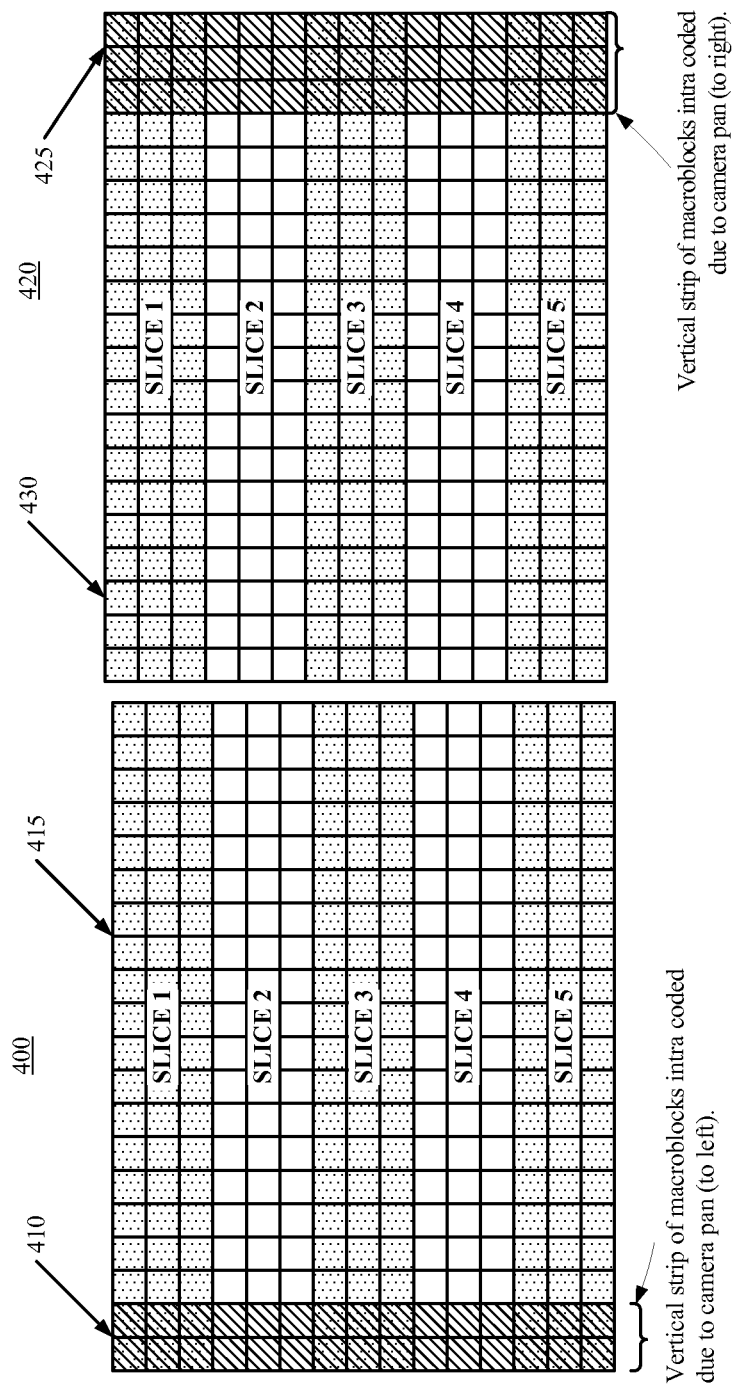
FIG. 6A illustrates a single frame having a vertical strip structured group of intra-coded macroblocks and a plurality of parallel horizontally extending inter-coded slices, where the vertical strip of intra-coded macroblocks begins on the left boundary of the frame.
FIG. 6B illustrates a single frame having a vertical strip structured group of intra-coded macroblocks and a plurality of parallel horizontally extending inter-coded slices, where the vertical strip of intra-coded macroblocks begins on the right boundary of the frame.

FIG. 6A illustrates a single frame 400 having a single vertical strip structured group of intra-coded macroblocks 410 and a plurality of parallel horizontally extending inter-coded slices 415, where the vertical strip of intra-coded macroblocks begins on the left boundary of the frame 400. In this example, slices 1-5 are parallel and each occupy the same number of rows. The arrangement of the vertical strip structured group of intra-coded macroblocks 410 partially overlapping and hence lying within the inter-coded slices 1-5 is confined within a single VAU denoted by the varying hatching of the macroblocks 410, and extend fully from the upper border to the lower border of the frame 400.

FIG. 6B illustrates a single frame 420 having a single vertical strip structured group of intra-coded macroblocks 425. The frame 420 further comprises a plurality of parallel horizontally extending inter-coded slices 430, where the vertical strip of intra-coded macroblocks 425 begins on the right boundary of the frame 420. The vertical strip of intra-coded macroblocks 425 partially overlaps and hence lies within the inter-coded slices 1-5 as denoted by the varying hatching of the macroblocks 425.

Figure 6C:
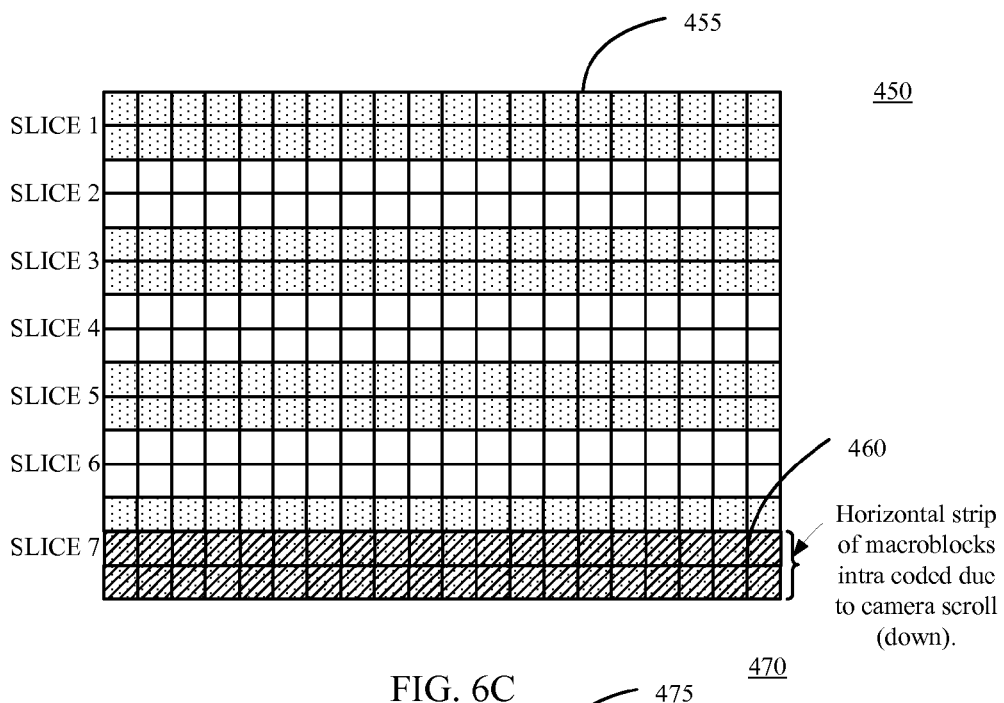
FIG. 6C illustrates a single frame having a single horizontal strip structured group of intra-coded macroblocks and a plurality of parallel horizontally extending inter-coded slices, where the horizontal strip structured group of intra-coded macroblocks begins on the bottom boundary of the frame.

FIG. 6C illustrates a single frame 450 having a single horizontal strip structured group of intra-coded macroblocks 460. The frame 450 further includes a plurality of parallel horizontally extending inter-coded slices 455 where the single horizontal strip structured group of intra-coded macroblocks 460 begins on the bottom boundary of the frame 450 and extends fully from left to right of the frame 450.

Figure 6D:
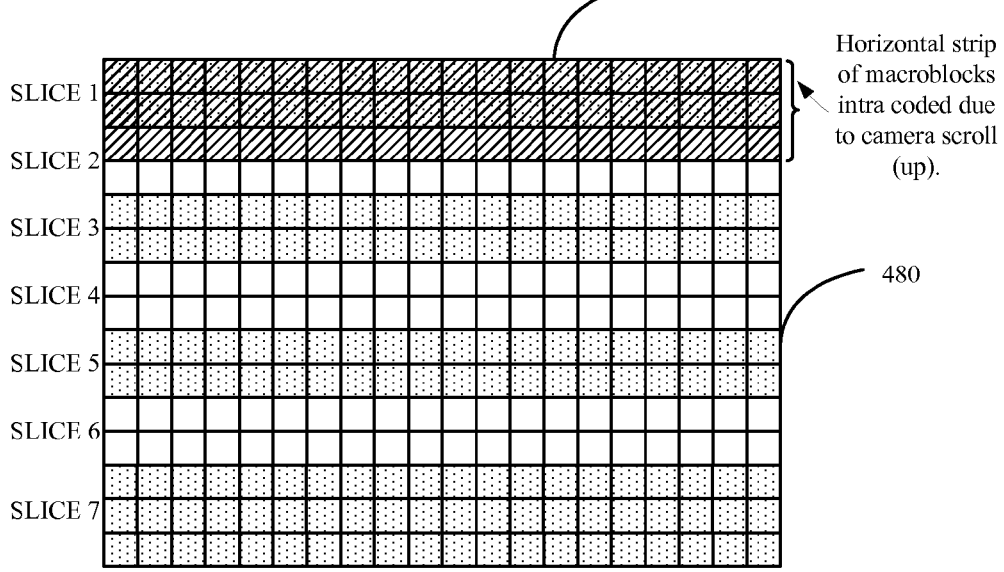
FIG. 6D illustrates a single frame having a single horizontal strip structured group of intra-coded macroblocks and a plurality of parallel horizontally extending inter-coded slices, where the horizontal strip structured group of intra-coded macroblocks begins on the top boundary of the frame.

FIG. 6D illustrates a single frame 470 having a single horizontal strip structured group of intra-coded macroblocks 475 and a plurality of parallel horizontally extending inter-coded slices 480, where the single horizontal strip structured group of intra-coded macroblocks 475 begins on the top boundary of the frame 470 and extends fully from left to right of the frame 470. When there is a need to employ intra-coding in a sizeable portion of a frame, and the slice structure is not carefully tailored with respect to the geometry of this region, slice boundaries within the region to be intra-coded will reduce the intra-coding efficiency. This is essentially due to the unavailability across slice boundaries of those neighboring pixels which could otherwise have been used for intra-prediction and the consequent unavailability of certain intra prediction modes due to neighbor unavailability. FIGS. 6A-6D illustrate cases in which common slice structures further divide the regions to be intra-coded and conflict with intra-coding efficiency according to certain configurations.

Figure 7:
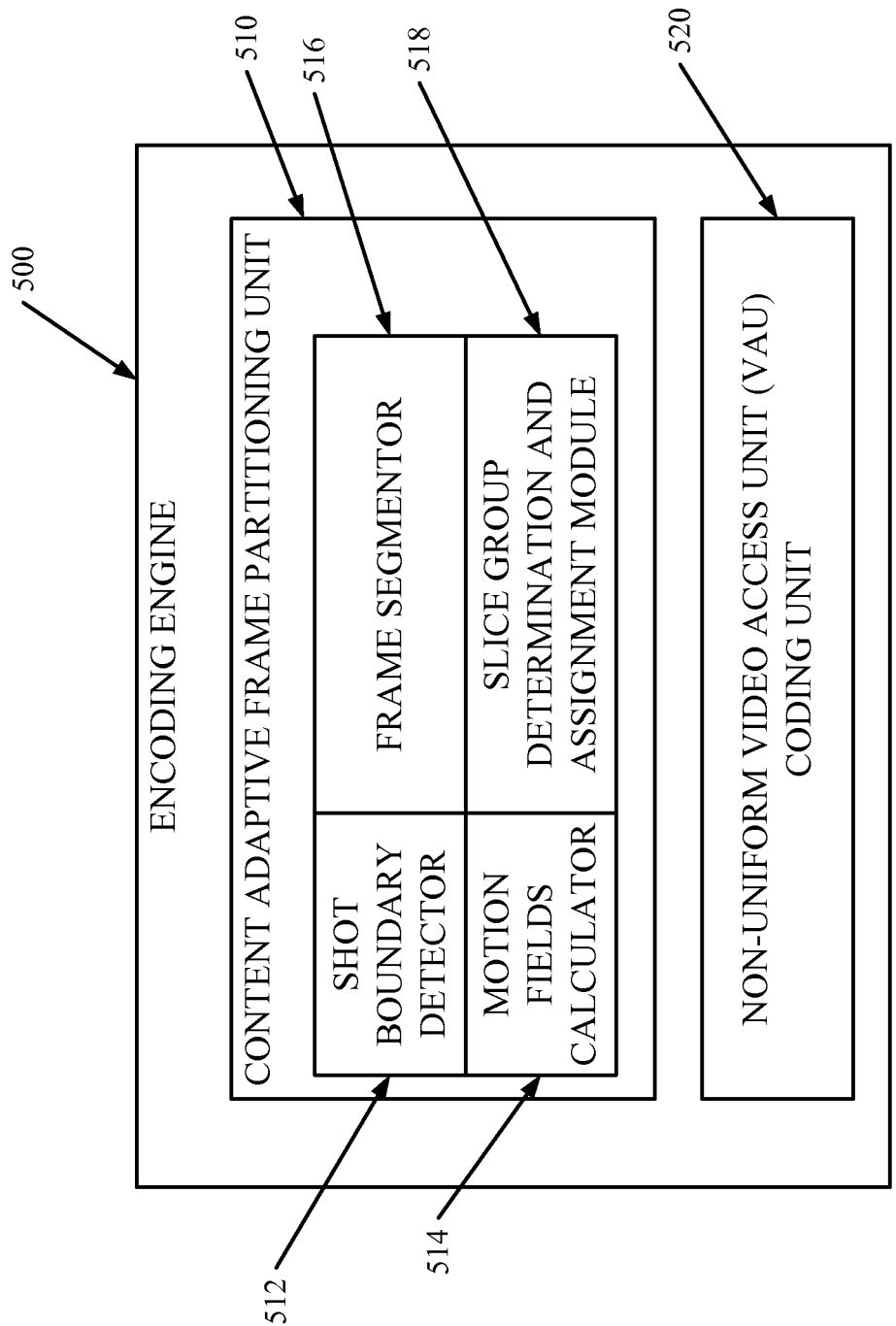
FIG. 7 illustrates an encoding engine for performing content adaptive frame partitioning (into slice groups and slices) and non-uniform VAU coding.

FIG. 7 illustrates an encoding engine 500 for performing content adaptive frame partitioning (into slice groups and slices) and non-uniform VAU coding. The encoding engine 500 include a content adaptive frame partitioning unit 510 and a non-uniform video access unit (VAU) coding unit 520. The content adaptive frame partitioning unit 510 comprises a shot boundary detector 512, a motion fields calculator 514, and frame segmentor 516. The content adaptive frame partitioning unit 510 further includes a slice group determination and assignment module 518.

The shot boundary detector 512 detects one or more shot boundaries of one or more frames. In one aspect, detecting a shot boundary includes detecting a scene change. Detection of scene changes and shot boundaries is important since these events imply interruptions in the continuity of motion fields and changes in the composition of the scene. The motion fields calculator 514 calculates motion fields of the one or more frames such as the I-frames, P-frames, B-frames, etc. In one aspect, the detected global motion operations include operations such as camera pan or scroll, zoom-in or zoom-out for P and B types, and complex motion-deformation instances in B and P type will necessitate the use of intra-coding in these otherwise temporally predicted access units. As the motion fields are determined, a camera pan or scroll, zoom-in or zoom-out may be determined so that the VAU may be non-uniformly coded accordingly. In one embodiment, information about distinctively different motion field segments within a frame, such as differing in the direction and strength of the motion vectors they contain, may be provided to the frame segmentor unit as a cue to facilitate its segmentation task.

The frame segmentor 516 is for segmenting the one or more frames. The frame segmentor 516 segments or divides the frames into one or more groups of macroblocks such as those sets of macroblocks associated with Slice Group #0 and Slice Group #1 structures, as shown in any one of FIGS. 9A-9D.

The slice group determination and assignment module 518 analyzes the frame segmentor unit output with the purpose of associating the identified one or more macroblock groups with one or more slice groups and with one or more slices within each said slice group. The slice group determination and assignment module 518 analyzes the sizes and geometries of the identified one or more macroblock groups, their predictability attributes such as inter-predictable or intra-predictable, assigns the one or more macroblock groups to one or more slice groups, and determines the size of the one or more slices within the said one or more slice groups (such as the number of rows for any one slice of any one slice group). The slice group determination and assignment module 518 determines the slice groups, slices, and/or slice types for the one or more frames. The non-uniform video access unit (VAU) coding unit 520 performs the non-uniform encoding on those macroblocks associated with the determined type.

Referring again to FIG. 2A, based on the slice group and/or slice type, the slice will be encoded using inter-coding or intra-coding by the inter-coding encoder 118 or intra-coding encoder 120, respectively. Thus, the encoding device 100 encodes the slices in accordance with the inter-coding or intra-coding techniques based at least in part on the determined slice groups and/or the slices and/or the slice types.

The content adaptive frame partitioning (into slice groups and slices) and non-uniform VAU coding handle the reduced coding efficiency resulting from the mechanisms described. Thus, the global motion operations, such as camera pan or scroll, zoom-in or zoom-out in P and B type coded VAUs, and complex motion-deformation instances in B and P type coded VAUs which do not fit the rigid-body translational motion model (such as an object experiencing rotational motion), will necessitate the use of intra-coding in otherwise temporally predicted access units. The non-uniform VAU coding will use intra-coding in temporally predicted access units with increased efficiency.

Figure 8:
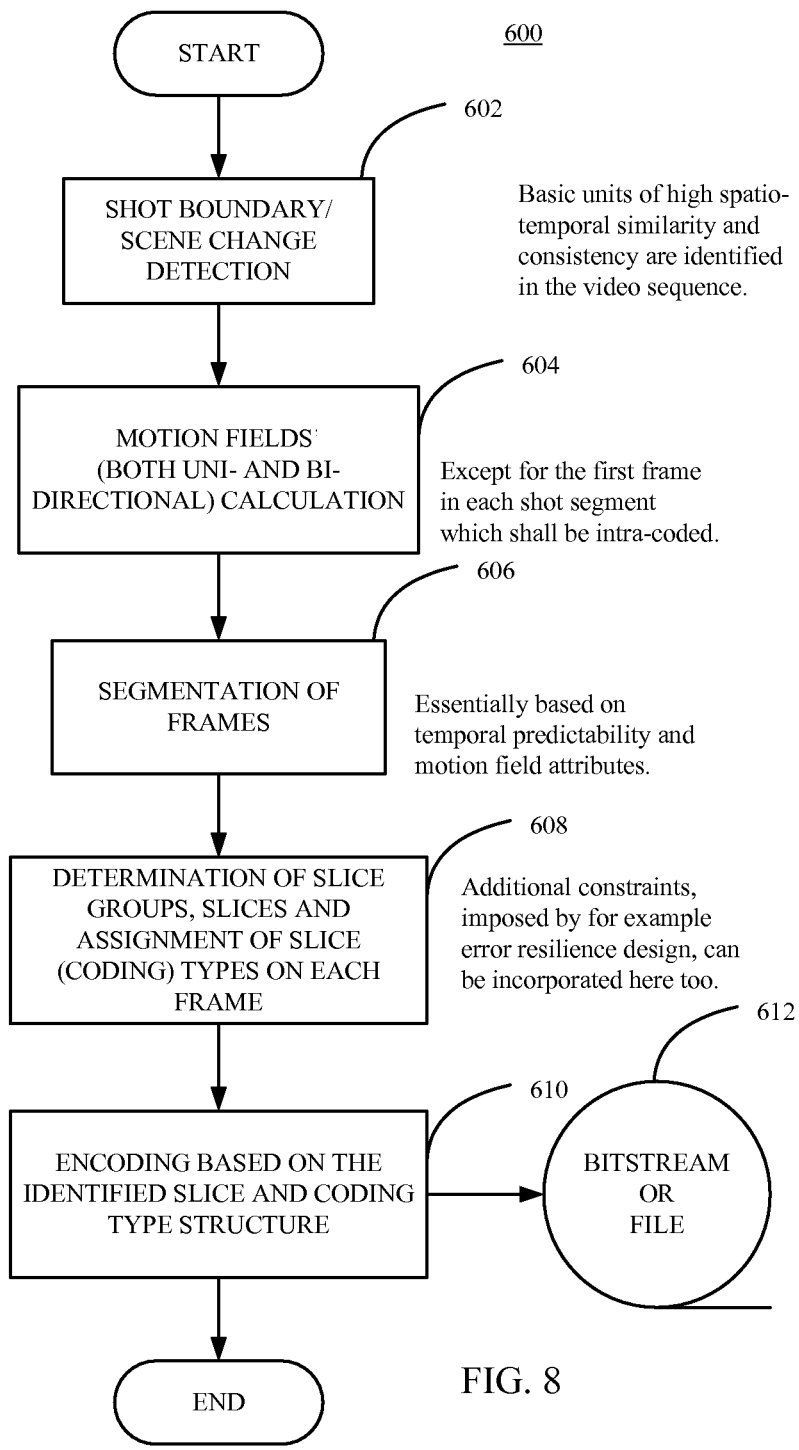
FIG. 8 illustrates a flowchart of the process for performing content dependent frame partitioning and non-uniform video access unit coding according to certain configurations.

In order to fulfill this requirement in the most efficient manner, an encoder can adopt a processing flow similar to the one illustrated in FIG. 8. As a result of this enhanced processing, the slice partitioning structure for the sample cases illustrated in FIGS. 6A-6D shall be modified to those illustrated in FIG. 9A-9D. It should be understood that the sample cases in FIG. 6A-6D and FIG. 9A-9D are provided only for illustrative purposes, and the segmentation/partitioning of a frame into regions (macroblock groups), slice groups, and slices based on predictability attributes can happen in a totally flexible manner based on the provisions of FMO.

In various configurations below, flowchart blocks are performed in the depicted order or these blocks or portions thereof may be performed contemporaneously, in parallel, or in a different order.

FIG. 8 illustrates a flowchart of the process 600 for achieving content dependent frame partitioning and non-uniform video access unit coding according to certain configurations. The process 600 begins with shot-boundary/scene-change detection at block 602. Basic units of high spatio-temporal similarity adding consistency are identified in the video sequence through scene change detection which interrupts spatio-temporal similarities and marks the boundaries of such basic units. Block 602 is followed by block 604 where motion fields are calculated. In one aspect, bi-directional and uni-directional calculations are used to identify predictability attributes of frames or one or more regions within frames such as inter-predictable or not, global motion operations such as camera pan or scroll, zoom-in or zoom-out as well as identifying regions (macroblock groups) within frames with distinctively different motion characteristics such as static (non-changing), uniform motion, non-uniform motion regions.

It should be noted that in a shot segment the motion fields are calculated for all frames except for the first frame of the video segment. In general a video sequence will comprise multiple shot segments i.e. semantically consistent sets of consecutive video frames separated by scene changes. An IBP . . . arrangement will more correctly be referred to as a 'GOP structure'. Although it is desirable to align I-frames with scene changes, it is not necessary to do so and there are other reasons for inserting uniformly spaced I-frames not necessarily aligned with scene changes (such as enabling random access with an upperbounded delay performance). For example, the frame 350 of FIG. 5A is an I-frame and would not be subjected to motion field calculations. However, for the frame 370 in FIG. 5B, which is a P-type frame, the motion field calculations would be performed. The first frame or I-frame will be intra-coded in its entirety.

Block 604 is followed by block 606 where the frames are segmented. The segmentation of the frames is essentially based on temporal predictability and motion field attributes. Block 606 is followed by block 608 where slice group determination and assignment takes place. The slice groups, slices and assignment of slice (coding) types on each frame is determined. At block 608, the absolute address of the first macroblock in each slice (first mb_in_slice) and/or inverse scan macroblock information within each slice may be identified. In specific relation to FIG. 9A, a frame 700 is shown. Here, Slice 6 is identified to have I-type coding. The slice boundaries are determined, such as the number of vertical macroblock columns to be included in Slice 6. In one aspect, slice 6 is associated with the vertical strip of macroblocks and need to be intra-coded due to the camera pan to the left. Moreover, slices 1, 2, 3, 4 and 5 are determined here. In this specific frame, slices 1-5 are P-type slices. Thus, in general, the slice 6 would be the I-type while the remaining slices are either all P Type or all B Type.

In block 608, the encoder engine may also incorporate additional constraints, such as for error resiliency. Block 608 is followed by block 610, where encoding based on the identified slice coding types takes place, for example, intra-coding and inter-coding of the slices. Block 610 ends the process 600. The output of the process 600 may be sent to a file in the memory 114 and/or sent in a bitstream to the transceiver 116, at block 612, for delivery to the decoder device 150 over the network 140.

The output of the process 600 depending on the specific standard or other non-standard video compression algorithm being used, will also contain information regarding the association of macroblocks with slice groups and slices.

Figure 11:
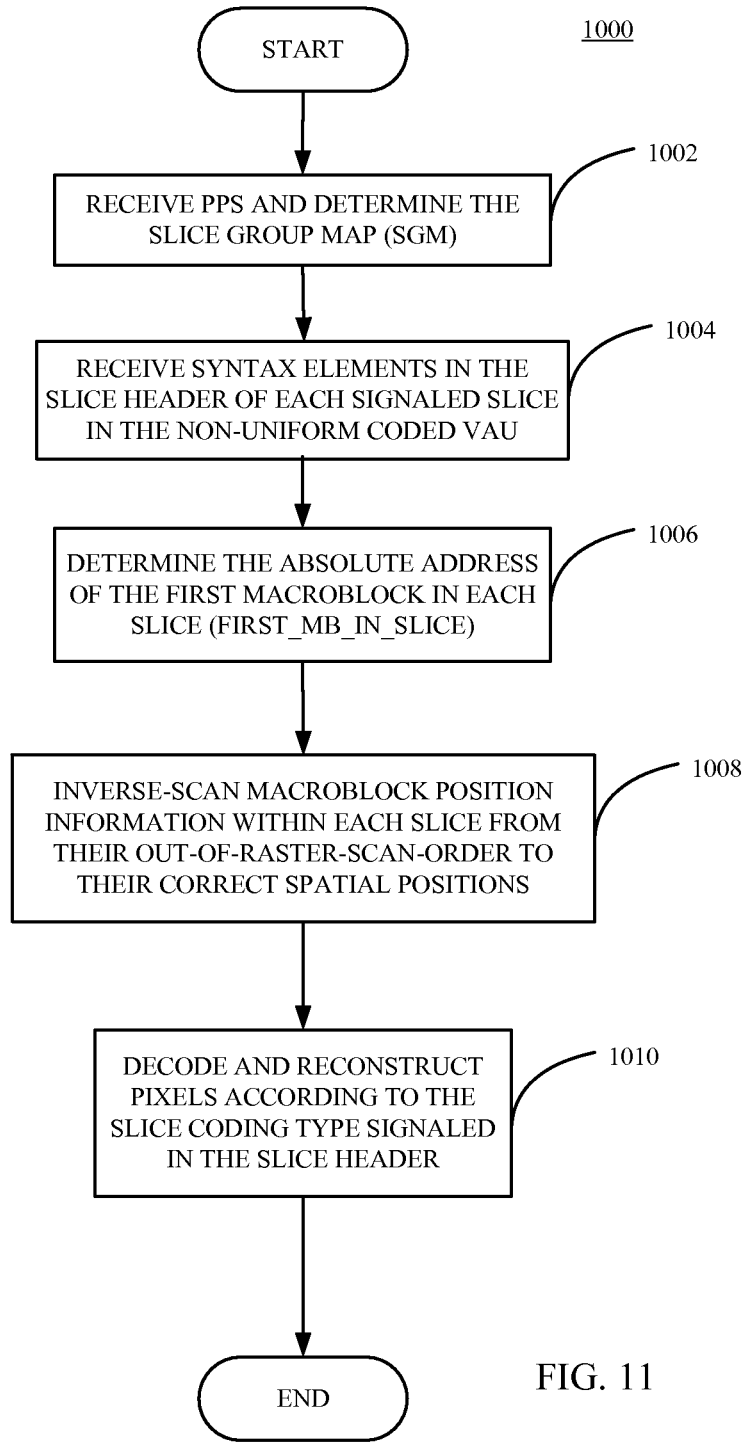
FIG. 11 illustrates a flowchart of a process for non-uniform VAU decoding.

FIG. 11 illustrates a flowchart of a process 1000 for non-uniform VAU decoding in the presence of flexible macroblock ordering (FMO) use. The FMO provision in the H.264 standard enables totally flexible partitioning (not constrained by raster-scan order implied consecutiveness) and grouping of the set of macroblocks of a video frame into one or more slice groups, and into one or more slices within each slice group. The partitioning of the set of macroblocks into one or more slice groups and into one or more slices within each slice group, is determined by the encoder, and the resulting association between macroblocks and slice groups and slices should be provided to the decoder. For example, in the H.264 standard this association is signaled in the Picture Parameter Sets (PPS) through Slice Group Maps (SGMs). The decoding operation will use the information provided by the Slice Group Map (SGM) and also the syntax element in the header of each slice signaling the absolute address of the first macroblock in the slice, 'first_mb_in_slice', to inverse-scan macroblock information within each slice from their out-of-raster-scan-order to their correct spatial positions. Consequently the decoding and pixel reconstruction process will take place in accordance with the slice coding type again signaled in the slice header. The decoder device 150 will perform non-uniform VAU decoding using the SGM generated and written into the bitstream by the encoder when FMO provision is in use.

In various configurations below, flowchart blocks are performed in the depicted order or these blocks or portions thereof may be performed contemporaneously, in parallel, or in a different order.

The process 1000 begins with block 1002 where the decoder device 150 receives PPS and determines the SGM generated by the encoder device 110. The decoder device 150 also receives syntax elements in the slice header of each signaled slice in the non-uniform coded VAU according to block 1004. Block 1004 is followed by block 1006 where the absolute address of the first macroblock in each slice (first_mb_in_slice) is determined. Block 1006 is followed by block 1008 where the inverse-scanning operation of macroblock position information within each slice from their out-of-raster-scan order to their correct spatial positions takes place. Block 1008 is followed by block 1010 where the non-uniform coded VAU is decoded and pixels, according to the slice coding type as signaled in the slice header, are reconstructed.

Figures 9A, 9B:
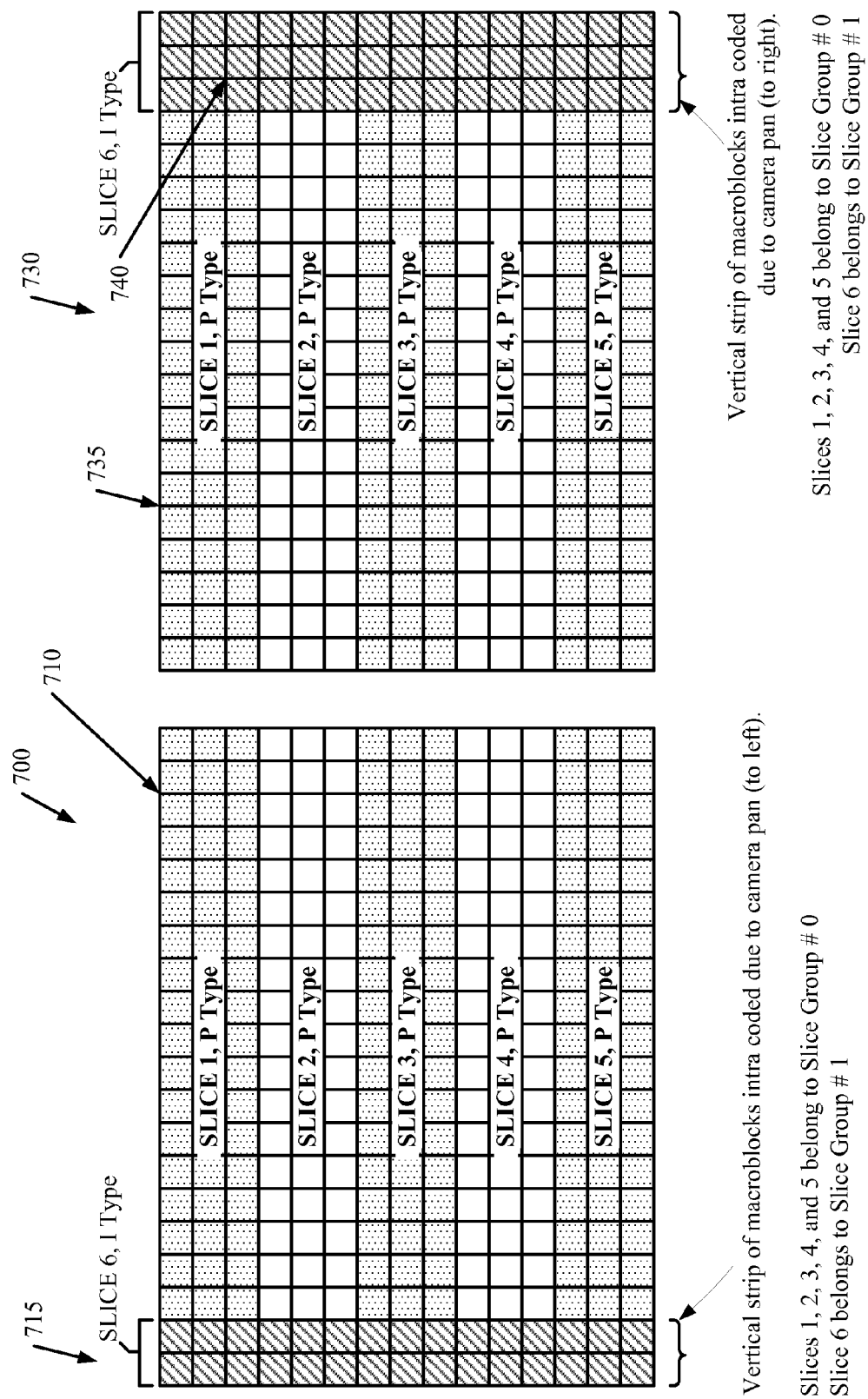
FIGS. 9A-9D illustrate exemplary cases of non-uniform VAUs (with respective to both slice geometry and coding type) derived from content adaptive video frame slicing according to certain configurations.

FIGS. 9A-9D illustrate exemplary cases of non-uniform coded VAUs (with respect to both slice geometry and slice coding type) derived from content adaptive video frame slicing according to certain configurations. In FIG. 9A, the non-uniform coded VAU 700 includes a vertical slice #6 as a vertical strip 715 of macroblocks on the left side of the VAU and is designated as I type to be intra-coded. The vertical strip 715 starts at the left edge or border of the VAU 700 and extends one or more macroblock columns therefrom to define the right edge or border of the slice. The vertical strip 715 extends from the top to the bottom of the video frame. The remaining slices 1-5 designated at 710 are inter-coded as a P type slice. Slices 1-5 are parallel, horizontally structured and are grouped into slice group #0. The left boundary for the slice group #0 begins on the rightmost edge or border of the slice #6 and extends to the right boundary of the non-uniform coded VAU 700. Thus, the absolute address for the first macroblock in each of slices 1-5 would be set accordingly.

In FIG. 9B, the non-uniform coded VAU 730 includes a vertical slice #6 as a vertical strip 740 of macroblocks on the right side of the VAU and is designated as I type to be intra-coded. The vertical strip 740 extends from the one or more macroblock columns away from the right edge or border of the VAU 730 and extends one or more macroblock columns to the right edge or border of the VAU 730. The vertical strip 740 also extends from the top to the bottom of the VAU 730. The remaining slices 1-5 designated at 735 are inter-coded as a P type slice. Slices 1-5 are parallel, horizontally structured and are grouped into slice group #0. In this case, the left boundary for the slice group #0 begins on the left edge or border the VAU 730 and it extends to the left boundary of the vertical strip 740. Thus, the absolute address for the first macroblock in each of slices 1-6 would be set accordingly.

Figure 9C:
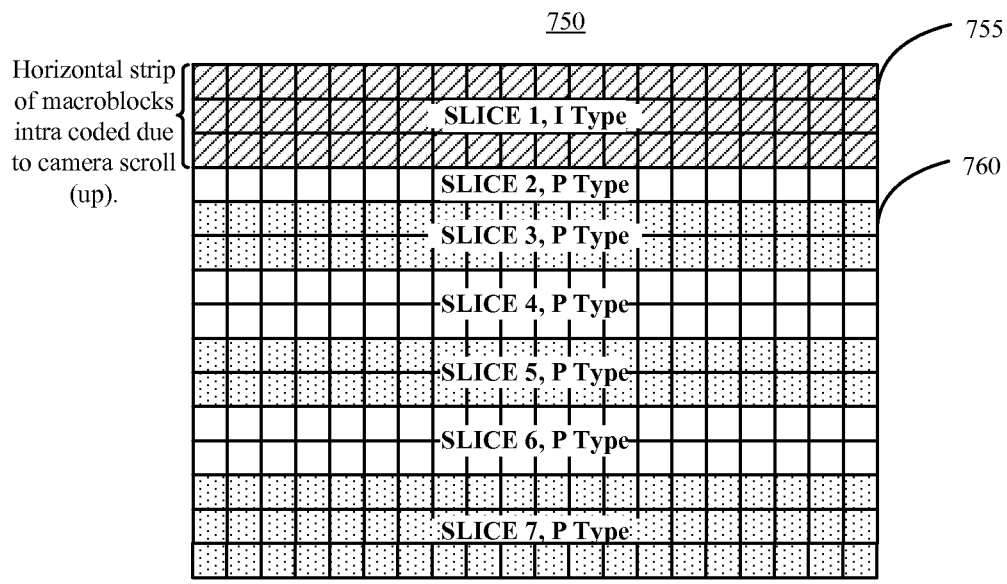

In FIG. 9C, the VAU 750 includes a single horizontal slice #1 as a horizontal strip 755 on the top side of the VAU 750 and is designated as I type to be intra-coded. The remaining slices 2-7 designated at 760 are inter-coded as a P type slice. In this case, the right and left borders of the horizontal strip 755 coincide with the right and left borders or edges of the VAU 750. The top edge of the horizontal strip 755 coincides with the top edge of the VAU 750. However, the bottom edge of the horizontal strip 755 extends one or more rows downward from the top VAU edge. Slices 2-7 are parallel and horizontally structured in a slice group #1. In this case, the right and left borders of the each slice in the slice group #1 also coincide with the right and left borders or edges of the VAU 750. In this arrangement, the number of rows in slices 1-7 and their sizes may not be equal. The last slice of the slice group #1, in this case slice #7, has a bottom border which coincides with the bottom border of the VAU 750.

Figure 9D:
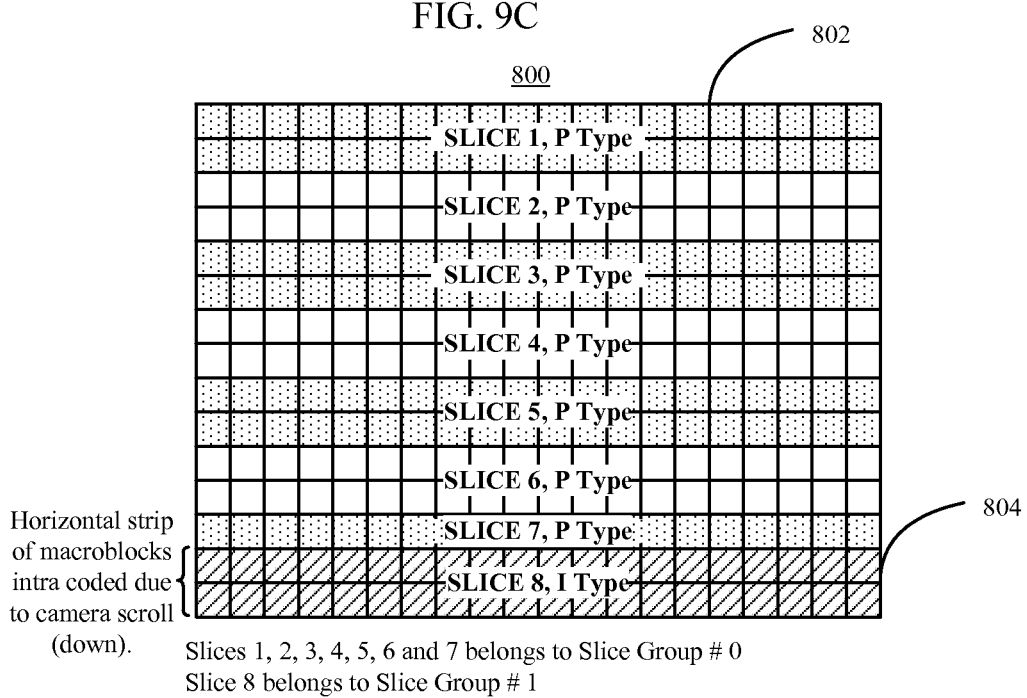

In FIG. 9D, the VAU 800 includes a single horizontal slice #8 as a horizontal strip 804 on the bottom of the VAU 800 and is designated as I type to be intra-coded. The bottom edge of the horizontal strip 804 coincides with the bottom edge of the VAU 800. The horizontal strip 804 extends one or more macroblock rows up from the bottom edge of the VAU 800. The remaining slices 1-7 designated at 802 are inter-coded such as a P type slice. Slices 1-7 are parallel and horizontally structured into slice group #0. In this arrangement, the number of rows in slices 1-8 and their sizes may not be equal. The first slice of the slice group #0, in this case slice #1, has a top border which coincides with the top border of the VAU 750. The right and left borders of all slices coincide with the right and left borders of the VAU 750.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A device comprising:
   a processor that:
      segments a frame into slice groups and slices based on predictability attributes of macroblock groups within the frame, the predictability attributes including intra-predictability of the macroblock groups and inter-predictability of the macroblock groups;
      determines slice coding types for the frame; and
      encodes the slices in accordance with inter-coding or intra-coding techniques based at least in part on the determined slice coding types, wherein there are different slice coding types within the frame; and
   a memory coupled to the processor,
      wherein the slice groups include a first slice group having a single one of the slices and a second slice group having a plurality of the slices, the slice of the first slice group comprises a strip of intra-coded macroblocks, the slices of the second slice group comprise inter-coded macroblocks and are parallel horizontally extending slices, and the strip having three edges coinciding with three border edges of the frame and a fourth edge coinciding with the inter-coded macroblocks of the second slice group.

2. The device according to claim 1, wherein the processor:
detects one or more shot boundaries of one or more frames, and
calculates motion fields of the frame,
wherein the predictability attributes include the motion fields.

3. The device according to claim 1, wherein the slice coding types include a P slice coding type, a B slice coding type, or an I slice coding type.

4. The device according to claim 1,
wherein the processor detects global motion operations, and
wherein the predictability attributes include the global motion operations.

5. The device according to claim 4, wherein the global motion operations include camera pan left, camera pan right, camera scroll up or camera scroll down.

6. The device according to claim 1, wherein the processor:
employs flexible macroblock ordering (FMO) when segmenting the frame into slice groups and slices; and
uses different ones of the slice coding types to code the slice groups within the frame in response to one or more changes in a composite scene, the one or more changes affecting one or more portions of the frame but not all of the frame.

7. A multimedia system comprising:
a content adaptive frame partitioning unit that segments a frame, based on predictability attributes of macroblock groups within the frame, into at least a first slice group and a second slice group, the first slice group including a slice that contains a strip of intra-coded macroblocks, the second slice group including a plurality of parallel horizontally extending inter-coded slices, wherein the strip has three edges coinciding with three border edges of the frame and a fourth edge coinciding with the inter-coded slices of the second slice group;
a determiner that determines slice coding types for the frame; and
a non-uniform video access unit (VAU) coding unit that encodes the slices in accordance with inter-coding or intra-coding techniques based at least in part on the determined slice coding types, wherein there are different slice coding types within the frame.

8. The multimedia system according to claim 7, wherein the frame partitioning unit comprises:
a detector that detects one or more shot boundaries of one or more frames; and
a calculator that calculates motion fields of the frame,
wherein the predictability attributes include the motion fields.

9. The multimedia system according to claim 7, wherein the slice coding types include a P, a B, or an I slice coding type.

10. The multimedia system according to claim 8, wherein the calculator detects global motion operations, and wherein the predictability attributes include the global motion operations.

11. The multimedia system according to claim 10, wherein the global motion operations comprise camera pan left, camera pan right, camera scroll up or camera scroll down.

12. A method for processing multimedia data, the method comprising:
segmenting a frame, based on predictability attributes of macroblock groups within the frame, into at least a first slice group and a second slice group, the first slice group including a slice that contains a strip of intra-coded macroblocks, the second slice group including a plurality of parallel horizontally extending inter-coded slices, wherein the strip has three edges coinciding with three border edges of the frame and a fourth edge coinciding with the inter-coded slices of the second slice group;
determining slice coding types for the frame; and
performing non-uniform VAU coding that encodes the slices in accordance with inter-coding or intra-coding techniques based at least in part on the determined slice coding types, wherein there are different slice coding types within the frame.

13. The method according to claim 12, further comprising detecting global motion operations, wherein the predictability attributes include the global motion operations.

14. The method according to claim 12, wherein segmenting the frame includes:
detecting one or more shot boundaries of one or more frames; and
calculating motion fields of the frame, wherein the predictability attributes include the motion fields.

15. The method according to claim 12, wherein the slice coding types include a P, a B, or an I slice coding type.

16. The method according to claim 12, further comprising associating a horizontal or vertical border edge of the frame to the strip.

17. The method according to claim 14,
wherein calculating the motion fields comprises detecting global motion operations, and
wherein the predictability attributes include the global motion operations.

18. The method according to claim 17, wherein detecting the global motion operations comprises detecting one of a camera pan left, a camera pan right, a camera scroll up or a camera scroll down.

19. An encoding apparatus comprising:
means for segmenting a video access unit (VAU) into slices and slice groups using flexible macroblock ordering (FMO), the VAU segmented into the slice groups and slices based on predictability attributes of macroblock groups within the VAU, the predictability attributes including intra-predictability of the macroblock groups and inter-predictability of the macroblock groups, two or more of the slices having different slice coding types, the predictability attributes including global motion operations, the global motion operations including a camera pan or a scroll,
wherein the slice groups comprise a first slice group and a second slice group, the second slice group having a plurality of parallel horizontally extending inter-coded slices, and the first slice group having a single strip of intra-coded macroblocks having three edges coinciding with three border edges of the VAU and a fourth edge coinciding with the inter-coded slices of the second slice group.

20. The encoding apparatus according to claim 19, further comprising:
means for detecting one or more shot boundaries of one or more frames; and
means for calculating motion fields of the one or more frames including the global motion operations, the predictability attributes including the global motion operations.

21. The encoding apparatus of claim 20, further comprising means for encoding the slices based at least in part on the slice coding types of the slices.

22. A computer program product that includes a non-transitory computer readable medium comprising instructions for processing multimedia data, wherein the instructions cause a computer to:
  use flexible macroblock ordering (FMO) to segment a frame, based on predictability attributes of macroblock groups within the frame, into at least a first slice group and a second slice group, the first slice group including one or more slices and the second slice group including one or more slices, the predictability attributes including intra predictability of the macroblock groups and inter predictability of the macroblock groups, wherein the second slice group includes a plurality of parallel horizontally extending inter-coded slices, and wherein the first slice group includes a single strip of intra-coded macroblocks having three edges coinciding with three border edges of the frame and a fourth edge coinciding with the inter-coded slices of the second slice group;
  determine slice coding types for the frame; and
  perform non-uniform video access unit (VAU) coding on the partitioned frame to encode the slices in accordance with inter-coding or intra-coding techniques based at least in part on the determined slice coding types, wherein there are different slice coding types within the frame.

23. The computer program product of claim 22, wherein the instructions to use FMO to segment the frame include instructions to cause the computer to:
  detect one or more shot boundaries of one or more frames;
  calculate motion fields of the frame,
  wherein the predictability attributes include the motion fields.

24. The computer program product according to claim 23, wherein the instructions to calculate the motion fields includes instructions to cause the computer to detect global motion operations.

25. The computer program product according to claim 22, wherein the frame is a multi-region scene with semantically different segments and the instructions to use FMO to segment the frame include instructions to cause the computer to partition the frame into the semantically different segments.

26. The computer program product according to claim 25, wherein the predictability attributes include one or more of: cut scene changes, cross-fades, fade-in or fade-outs, zoom-in or zoom-outs, and global motion varieties.

27. The computer program product according to claim 22, wherein the slice coding types include a P, a B, or an I slice coding type.

28. The computer program product according to claim 23, wherein the instructions to calculate include instructions to cause the computer to detect global motion operations, wherein the predictability attributes include the global motion operations.

29. The computer program product according to claim 28, wherein the instructions to detect the global motion operations includes instructions to cause the computer to detect one of a camera pan left, a camera pan right, a camera scroll up, and a camera scroll down.

30. An apparatus for processing multimedia data, the apparatus comprising:
  means for segmenting a frame into slice groups and slices based on predictability attributes of macroblock groups within the frame, the predictability attributes including intra predictability of the macroblock groups and inter predictability of the macroblock groups;
  means for determining slice coding types for the frame; and
  means for performing non-uniform video access unit (VAU) coding on the frame to encode the slices in accordance with inter-coding or intra-coding techniques based at least in part on the determined slice coding types, wherein there are different slice coding types within the frame, wherein the slice groups include a first slice group and a second slice group, the second slice group having a plurality of parallel horizontally extending inter-coded slices, and the first slice group having a single strip of intra-coded macroblocks having three edges coinciding with three border edges of the frame and a fourth edge coinciding with the inter-coded slices of the second slice group.

31. The apparatus according to claim 30, wherein the means for segmenting the frame includes:
  means for detecting one or more shot boundaries of one or more frames;
  means for calculating motion fields of the frame, wherein the predictability attributes include the motion fields.

32. The apparatus according to claim 30, wherein the slice coding types include a P, a B, or an I slice coding type.

33. The apparatus according to claim 30, wherein the frame is a multi-region scene with semantically different segments and the means for segmenting the frame includes means for partitioning the frame into the semantically different segments.

34. A decoding apparatus comprising:
  a decoding engine that decodes a single non-uniformly coded video access unit (VAU), wherein the VAU is segmented into slice groups and the slices using flexible macroblock ordering (FMO), the VAU segmented into the slice groups and slices based on predictability attributes of macroblock groups within the VAU, the predictability attributes including intra-predictability of the macroblock groups and inter-predictability of the macroblock groups, two or more of the slices having different slice coding types,
  wherein the decoding engine includes a selective decoder to decode a first slice group of the VAU and a second slice group of the VAU, the second slice group having a plurality of parallel horizontally extending inter-coded slices, and the first slice group having a single strip of intra-coded macroblocks having three edges coinciding with three border edges of the VAU and a fourth edge coinciding with the inter-coded slices of the second slice group.

35. The decoding apparatus according to claim 34, wherein the decoding engine receives picture parameter sets through slice group maps, and receives, for each of the slices, an absolute address of a first macroblock of the slice.

36. A computer program product that includes a non-transitory computer readable medium comprising instructions for processing multimedia data, wherein the instructions cause a computer to:
  decode a single non-uniformly coded video access unit (VAU), wherein the VAU is segmented into slice groups and slices using flexible macroblock ordering (FMO), the VAU segmented into the slice groups and the slices based on predictability attributes of macroblock groups within the VAU, the predictability attributes including intra-predictability of the macroblock groups and inter-predictability of the macroblock groups, two or more of the slices having different slice coding types,
  wherein the instructions to decode the VAU include instructions to cause the computer to decode a first slice group of the VAU and a second slice group of the VAU, the second slice group having a plurality of parallel horizontally extending inter-coded slices, and the first slice group having a single strip of intra-coded macroblocks having three edges coinciding with three border edges of the VAU and a fourth edge coinciding with the inter-coded slices of the second slice group.

37. The computer program product according to claim 36, wherein the instructions to decode include instructions to cause the computer to receive picture parameter sets through slice group maps, and to receive, for each of the slices, an absolute address of a first macroblock of the slice.

38. An encoding apparatus comprising an encoding engine that segments a video access unit (VAU) into slices and slice groups using flexible macroblock ordering (FMO), the VAU segmented into the slice groups and slices based on predictability attributes of macroblock groups within the VAU, the predictability attributes including intra-predictability of the macroblock groups and inter-predictability of the macroblock groups, two or more of the slices having different slice coding types,
   wherein the slice groups comprise a first slice group and a second slice group, the second slice group having a plurality of parallel horizontally extending inter-coded slices, and the first slice group having a single strip of intra-coded macroblocks having three edges coinciding with three border edges of the VAU and a fourth edge coinciding with the inter-coded slices of the second slice group.

39. The encoding apparatus of claim 38, wherein the predictability attributes include any one or more of cut scene changes, cross-fades, fade-in or fade-outs, zoom-in or zoom-outs, and global motion varieties.

* * * * *